A. ASCHERI.
WIRE CONNECTING DEVICE.
APPLICATION FILED AUG. 17, 1920.

1,382,048.

Patented June 21, 1921.

Inventor:
Antoine Ascheri
By Lawrence Langner
Attorney.

UNITED STATES PATENT OFFICE.

ANTOINE ASCHERI, OF NEUILLY-SUR-SEINE, FRANCE.

WIRE-CONNECTING DEVICE.

1,382,048.   Specification of Letters Patent.   Patented June 21, 1921.

Application filed August 17, 1920. Serial No. 404,189.

*To all whom it may concern:*

Be it known that I, ANTOINE ASCHERI, a citizen of the French Republic, residing at 28 Rue du Pont, Neuilly-sur-Seine, Seine, France, have invented a certain new and useful Wire-Connecting Device, of which the following is a specification.

The present invention relates to a wire connecting device. The male part of the device is provided with a slot corresponding to a similar slot provided in the female part and the wire which it is desired to fix to the member with which the male part is integral is inserted into this slot wherein it is tightly pressed, when the female part is caused to descend upon the male part.

This mode of connection can be advantageously utilized as a means for connecting the wire of a sparking plug for explosion motors but it will be understood that it can be usefully employed in other cases where it is desired to immovably connect a wire to any part.

In the accompanying drawings there are represented two modifications of construction provided according to the invention and applicable to a sparking plug.

Figure 1:
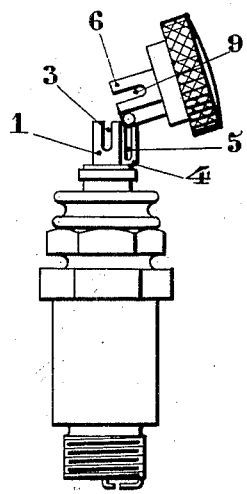
Figure 2:
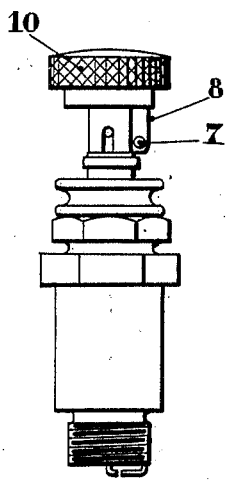

Figures 1 and 2 represent one construction in elevation. In Fig. 1 the parts are indicated in the open position in which the wire may be connected or withdrawn while Fig. 2 shows the respective parts on the wire being secured in position.

Figure 3:
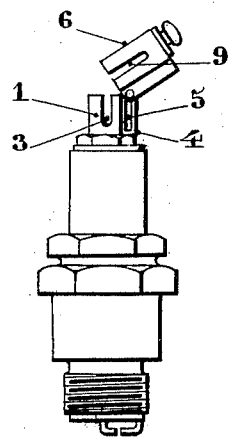
Figure 4:
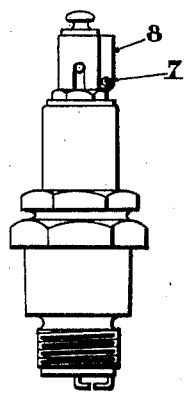
Figure 5:
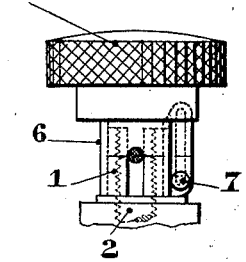
Figure 6:
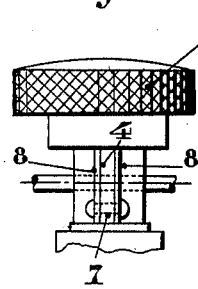
Figure 7:
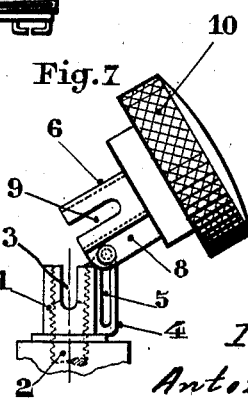

Figs. 3 and 4 are views similar to Figs. 1 and 2 of a second construction, while Figs. 5, 6 and 7 are elevations separately showing the means of connection. In Figs. 5 and 6 the parts are shown closed, Fig. 6 being an elevation at right angles to Figs. 5 and 7, while in Fig. 7 the respective parts are indicated in the open position.

As indicated in the drawings the connecting device comprises essentially a cylindrical part 1 forming the male part of the device and which is threaded on the inside and screwed upon the metallic rod 2 of the sparking plug. The part 1 has a slot 3 formed therein in a diametric plane and whose end is disposed at the same level as the extremity of the rod of the sparking plug, the part 1 being completely screwed upon this rod as indicated in Fig. 5. Upon the part 1 a lug 4 is provided which may be integrally formed therewith and in which is provided a slot 5. This slot is disposed in a plane parallel to the plane of the slot 3. A second cylindrical part 6 of a diameter slightly larger than that of the part 1 slides upon this part over which it fits, the part 6 forming the female part of the device and being guided in its movement by the slot 5 by means of the pivot pin 7 engaging in the slot. The ends of the pivot pin are carried and secured within the slide plates 8 which inclose the lug 4 and form lateral extensions of the surface of the part 6.

The position of the pivot pin 7 upon the female part is such that when this part is drawn to the limit of its movement it can pivot upon the pivot pin 7 while being maintained connected to the male part 1.

The cylindrical body of the part 6 has a slot 9 formed according to a diametric plane perpendicular to the plane of the side plates 8, this slot forming an extension of the slot 3 in the part 1.

The method of employment will be understood from the description as well as from an examination of the figures.

The female part 6 occupying the position represented in Figs. 1 and 3 the wire (for example of the secondary coil) is inserted in the slot 3 of the male part 1. The female part 6 is then straightened and is forced down over the male part. The ends of the slots 3 and 9 in approaching each other tightly press the wire and this pressure is maintained notwithstanding any vibration, the part 6 sliding with considerable friction upon the part 1 and being thus fixed upon that part.

In the construction illustrated in Figs. 1 and 2 a head 10 formed of ebonite is provided upon the female part which permits of that part being handled without fear of shocks due to the electric current.

In the simpler construction of Figs. 3 and 4 the female part is not provided with an ebonite head. It is simply provided with a small metallic head with which any suitable tool can be used.

It will be understood that the wire connecting device permits of ready and sure connection of the wire and that its manufacture is particularly simple.

I claim:

In a wire connection, the combination of a screw-threaded rod; a lower part screwed on said rod and having a diametrical open end slot provided therein for the reception of the wire to be connected; an upper part adapted to snugly fit and telescope with the lower part and having a diametrical open end slot coinciding with the slot in the lower part and coöperating therewith to secure the wire between the upper and lower parts; and means comprising a pin and slot connection between the upper and lower parts to maintain said slots alined and to permit the upper part to be slid upward away from the lower part and then to be swung aside to facilitate the introduction of the wire to the slots while maintaining the upper part and the lower part structurally connected.

ANTOINE ASCHERI.